(12) United States Patent
Becker et al.

(10) Patent No.: US 7,070,205 B2
(45) Date of Patent: Jul. 4, 2006

(54) HEADREST OF A VEHICLE SEAT WITH A SUPPORTING MEMBER

(75) Inventors: Burckhard Becker, Solingen (DE); Rolf Steinmetz, Düsseldorf (DE); Wilfried Beneker, Leichlingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 361 days.

(21) Appl. No.: 10/793,993

(22) Filed: Mar. 5, 2004

(65) Prior Publication Data

US 2005/0116457 A1    Jun. 2, 2005

(30) Foreign Application Priority Data

Nov. 28, 2003  (DE) ................................ 103 56 296

(51) Int. Cl.
*B60N 2/42*  (2006.01)
(52) U.S. Cl. ................. 280/751; 280/748; 297/216.12; 180/282
(58) Field of Classification Search ................ 280/748, 280/751, 730.2; 297/408, 409, 403, 404, 297/391, 396, 216.12; 180/271, 274, 282
See application file for complete search history.

(56) References Cited

U.S. PATENT DOCUMENTS

| | | | |
|---|---|---|---|
| 2,973,029 A * | 2/1961 | Schlosstein ............ 297/216.12 |
| 4,099,779 A * | 7/1978 | Goldner ...................... 297/408 |
| 5,378,043 A * | 1/1995 | Viano et al. ................. 297/408 |
| 5,927,803 A * | 7/1999 | Hehl et al. .............. 297/216.12 |
| 6,623,073 B1 * | 9/2003 | Schafer et al. ......... 297/216.12 |
| 6,655,733 B1 * | 12/2003 | Humer et al. .......... 297/216.12 |
| 6,688,697 B1 * | 2/2004 | Baumann et al. ............ 297/391 |
| 6,749,256 B1 * | 6/2004 | Klier et al. ............. 297/216.12 |
| 2001/0028190 A1 * | 10/2001 | Nakane et al. .............. 297/408 |
| 2005/0071518 A1 * | 3/2005 | Samra et al. ................... 710/1 |

* cited by examiner

*Primary Examiner*—Paul N. Dickson
*Assistant Examiner*—L McCreary, Jr.
(74) *Attorney, Agent, or Firm*—Akerman Senterfitt

(57) ABSTRACT

The headrest of an automotive vehicle seat has at least one bar (20) and one supporting member (26). Normally, the supporting member (26) is in a utilization position. When the automotive vehicle is involved in an accident, the supporting member (26) leaves the utilization position and adopts an accident position in which it is located in front of the utilization position. The at least one bar (20) comprises an oblique portion (30) that is located above an upper edge (32) of a backrest of the automotive vehicle seat. Said oblique portion has one component in the x direction and one component in the z direction. The supporting member (26) comprises a guide region (34) that conforms to the oblique portion (30) of bar (20) and that is movable relative to the oblique portion (30). An elastic means (spring 48) biases the supporting member (26) in the accident position. A releasable locking device (52) is associated with the elastic means, which it normally blocks. When the automotive vehicle is involved in an accident, the elastic means is released and causes the supporting member (26) to move from the utilization position to the accident position.

13 Claims, 5 Drawing Sheets

HEADREST OF A VEHICLE SEAT WITH A SUPPORTING MEMBER

BACKGROUND OF THE INVENTION

The application relates to an optimized headrest for the seat of an automotive vehicle e.g., for a front seat thereof. In a known manner, the headrest comprises padding to comfortably support an occupant's head. A supporting member, which is located substantially behind the padding and is padded thereby, provides mechanical stability to the headrest. Finally, the headrest has at least one bar that is in most cases slidably disposed in an associated backrest. In most cases, two bars are provided for. Headrests are known in which the inclination of the supporting member relative to the bars can be adjusted.

In the event the automotive vehicle is involved in an accident, it is important that the occupant's head be supported by the headrest. This is particularly important as far as rear impacts are concerned. Usually, the head of an occupant will not continuously rest on the padding; in most cases, the occupant will rather hold his head at a certain distance from the padding of the headrest. This is disadvantageous in accident situations because, in an accident situation, the occupant's head will have to move a certain distance before coming to rest against the headrest. It is well known that precisely the backward movement of the head relative to the upper body is disadvantageous as it may cause damage to the cervical spine. This injury is known as "whiplash". The art teaches various approaches to restrain backward movement of the head relative to the trunk in accident situations. Approaches have become known for example, in which the overall headrest is actively moved forward or in which the occupant's upper body is allowed to sink deeper into the padding of the backrest.

The invention also aims at possibly preventing, at least restraining, an occupant's head from moving backward in an accident situation. It is the object of the invention to develop a headrest which, in the event of a crash, provides support in closer proximity to the occupant's head than in the normal operating condition of the automotive vehicle, using the simplest possible means.

The solution to this object is achieved by the headrest having the features of claim 1.

BRIEF DESCRIPTION OF THE INVENTION

In this headrest, an oblique portion is inserted into the normal orientation of the bars. The oblique portion is bounded by a lower bend where the oblique portion is bent forward toward the positive x-axis, at an approximately 30° bend angle. The oblique portion ends at a top bend from which the upper end portion of the bar takes departure, said upper end portion being oriented substantially in much the same direction as the portion of the bar located underneath the oblique portion. Put another way, the bar is bent, with the bent portion forming the oblique portion thereof.

Upon release of the locking device, the supporting member is moved forward (in the x direction), and upward (in the x direction) as well, along the oblique portion. As it passes from the utilization position to the accident position, the supporting member rises in the z direction i.e., upward, by 4 to 8 cm for example, while concurrently moving forward in the positive x direction by approximately 3 to 6 cm for example. This accident position is advantageous in the event of a rear impact. The releasable locking device is preferably enabled upon detection of a rear impact by an associated crash sensor.

In a particularly advantageous design feature of the invention, the bars, in addition to performing their normal function, will now also be used to guide the movement of the supporting member of the headrest and said supporting member will be caused to move relative to the bars as a result of the accident. In the normal utilization position, the oblique portions are not visible, they are hidden within the covering of the padding. They will only become apparent in the accident position when they are located somewhat underneath the supporting member. In normal operation, the oblique portions are concealed.

In an advantageous development, the supporting member is made from one piece. It is preferably made from a plastic material such as POM e.g., by injection molding.

In an advantageous development, the supporting member has an opening that extends above a plate in the x direction and that is openable to an extent allowing passage of a transverse part therethrough. During assembly, the bars may thus be threaded into the guide regions and the supporting member is then pressed against the transverse part until the transverse part is behind the opening. This makes assembly easy.

In a development, the supporting member has a retaining system that cooperates with the bar and/or a transverse part and that keeps the supporting body in the accident position once it has been reached. This retaining device prevents the supporting member from yielding too much under the load of a head. The retaining device may be a lug behind which the transverse part extends when the accident position has been reached. Further, it is considered to push the guide regions so far upward in the accident position that they now are at least partially above the oblique portion so that, during an accident, they will not be pushed back under the load of a head.

Various release means may be used for the locking device, said release means being preferably designed as replaceable release means. This means that, once released, the headrest can be repaired. The release device must be quite quickly responsive. When the crash sensor enables the release device, the locking device must be released as quickly as possible. A fusible wire link, which is destroyed by an appropriate electrical current, has proved an efficient release device. Very fast release, occurring within milliseconds, is achieved in this manner. Alternatively, the release device could also comprise an electrically actuatable priming cartridge that pushes a retaining means into the release position or that destroys a retaining wire link. Eventually, an electromagnet may be utilized, said electromagnet attracting a retaining means, a catch for example, into the release position.

BRIEF DESCRIPTION OF THE DRAWINGS

Further advantages and features of the invention will become apparent in the remaining claims and in the following description of exemplary embodiments of the invention that will be explained in more detail herein after with reference to the drawing in which:

DETAILED DESCRIPTION OF THE INVENTION

Figure 1:
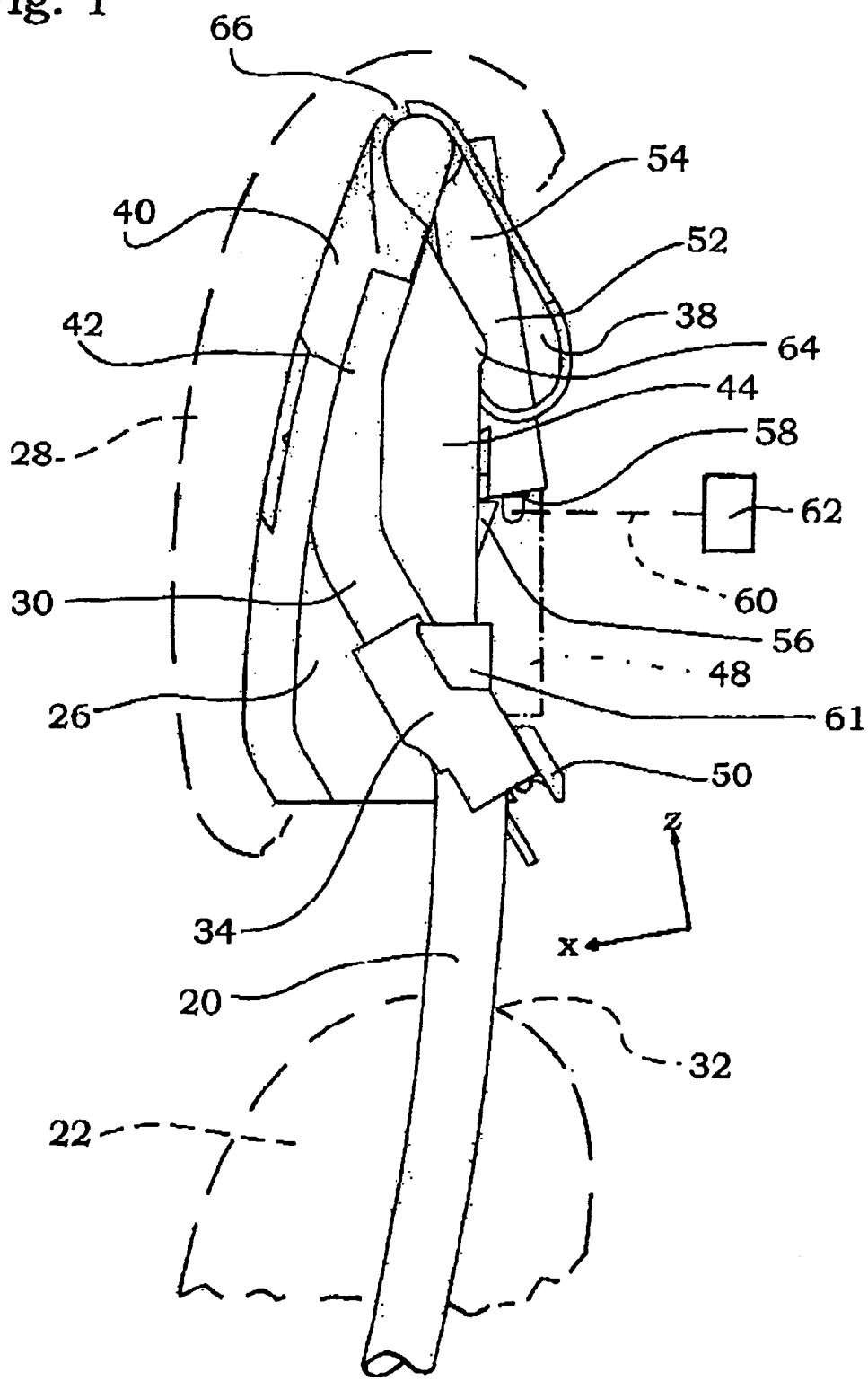
FIG. 1: is a side view of a headrest that is connected to a backrest the upper portion of which only is shown, with the headrest being in the utilization position.

The following description uses the coordinate system commonly used in the automotive technique, the x axis being oriented in the direction of travel, the y axis across the direction of travel in the horizontal plane and the z axis in the vertical plane.

The headrest has two bars 20 that are retained in a backrest 22, the bars 20 can be displaced in their longitudinal direction relative to the backrest 22 for permitting height adjustment of the headrest.

At their top region, the bars 20 are integrally joined together by a transverse part 24 to form a U-shaped piece. The bars 20 and the transverse part 24 carry a supporting member 26 which, in the exemplary embodiment shown, is substantially made from a single piece of plastic e.g., by injection molding. Said supporting member 26 will be discussed in greater detail herein after. Finally, the headrest comprises a padding 28 in the known manner, said padding being shown in dash-dot line in FIG. 1.

From all the Figures it can be seen that the bars 20 comprise an oblique portion 30. Within the oblique portion they are substantially straight, they are oriented so as to bend forward from the normal direction, with one component in the positive z direction and one component in the positive x direction, said oblique portion 30 being preferably inclined at an angle of about 15.degree. to the z direction, as measured in the direction toward the positive x direction, with a possible angular range of from 0.degree. to 50.degree., more preferably from 10.degree. to 30.degree. The backrest is thereby in the mounting position in which it is inclined backward in the direction of the negative x axis at an angle of about 19 to 20.degree. relative to the z axis. The oblique portion is from 5 to 15 cm in length. As shown in FIG. 1, the bar 20 is bent at an angle of about 15.degree. at the point which forms a lower bend and from which the oblique portion 30 takes departure. The oblique portion 30 is always located above the backrest 22, more specifically above an upper edge 32 of the backrest 22. Above the oblique portion, the bar 20 is approximately returned to the initial orientation it had underneath the oblique portion. There, there is an upper bend. Accordingly, the oblique portion is defined by two bends.

The supporting member 26 comprises a guide region 34 for each bar, said guide region surrounding, at least partially, the oblique portion 30. In the normal utilization position as it is shown in FIG. 1, the guide regions 34 are located in the lowermost section of the oblique portion 30 and are partially located in the bend there. The guide regions 34 are configured so that, from the utilization position shown in FIG. 1, they are allowed to easily glide, via the oblique portion 30, into the accident position of the headrest shown in FIG. 3.

The oblique portion 30 is located within the volume devoted to the supporting member 26, as best shown in FIG. 1. More specifically, the lower end of the oblique portion is located slightly above a lower end of the supporting member. The supporting member extends as far as the transverse part 24. In the region of the transverse part 24, there are provided two elongated, substantially oval loops 38 encompassing the transverse part 24. In the utilization position, the transverse part is located within the one end region of the loop 38 whereas, in the accident position, the transverse part 24 fits against the other end of the loop 38 (see FIG. 3). The loops 38 guide the supporting member 26 as it moves from the normal utilization position to the accident position.

Figure 2:
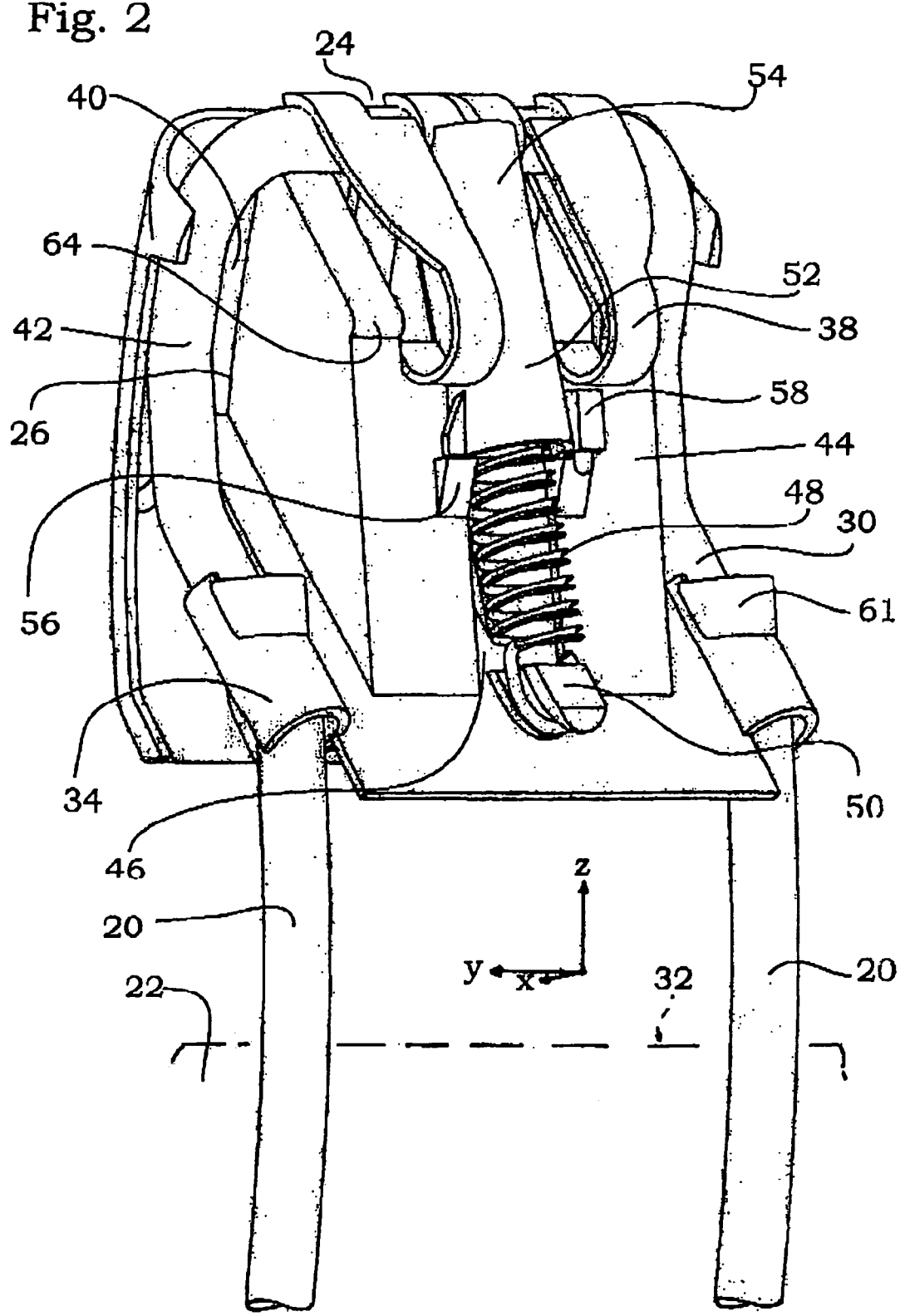
FIG. 2: is a perspective view of the headrest of FIG. 1, viewed obliquely from behind.
Figure 3:
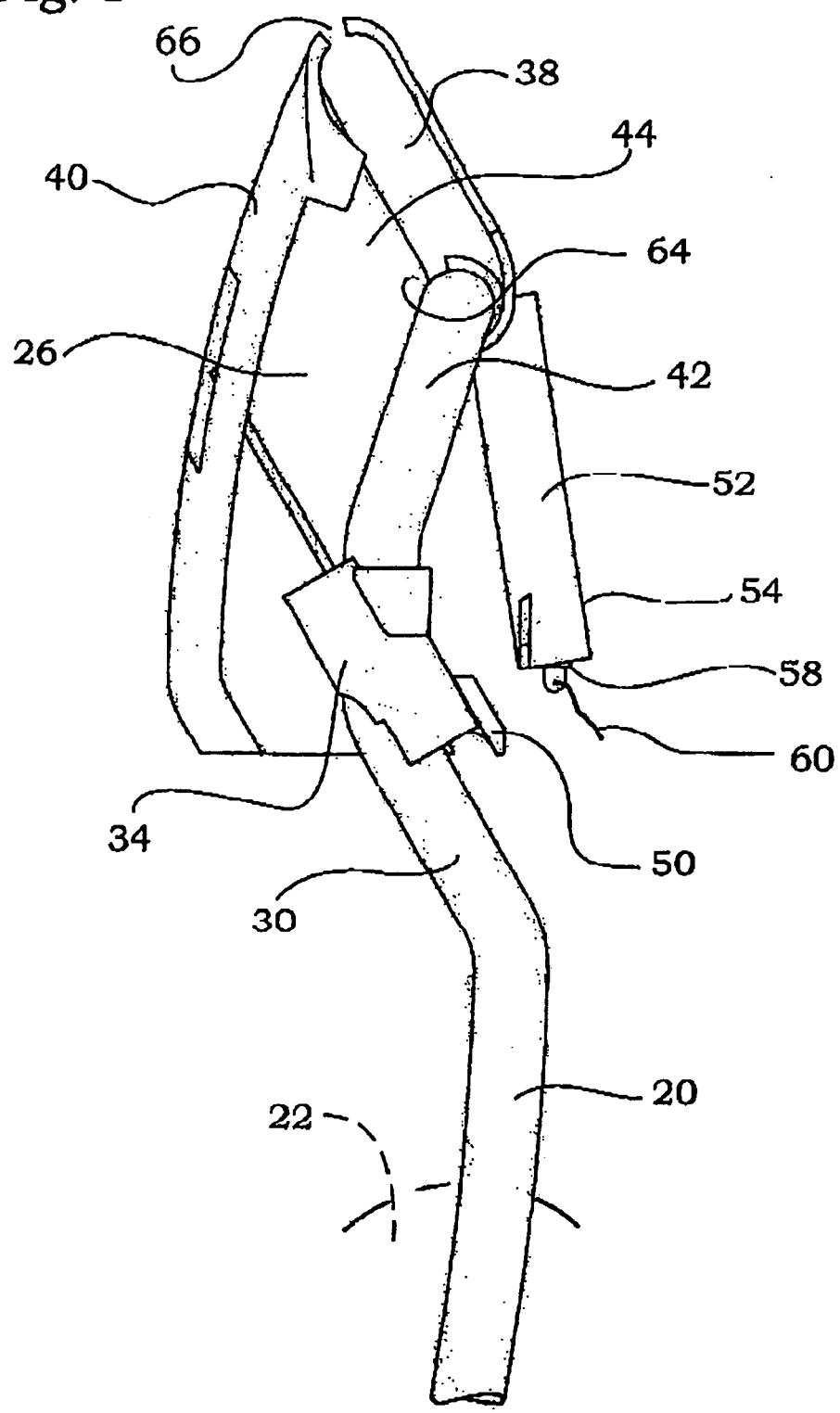
FIG. 3: shows the headrest of FIG. 1, which is now in the accident position.
Figure 4:
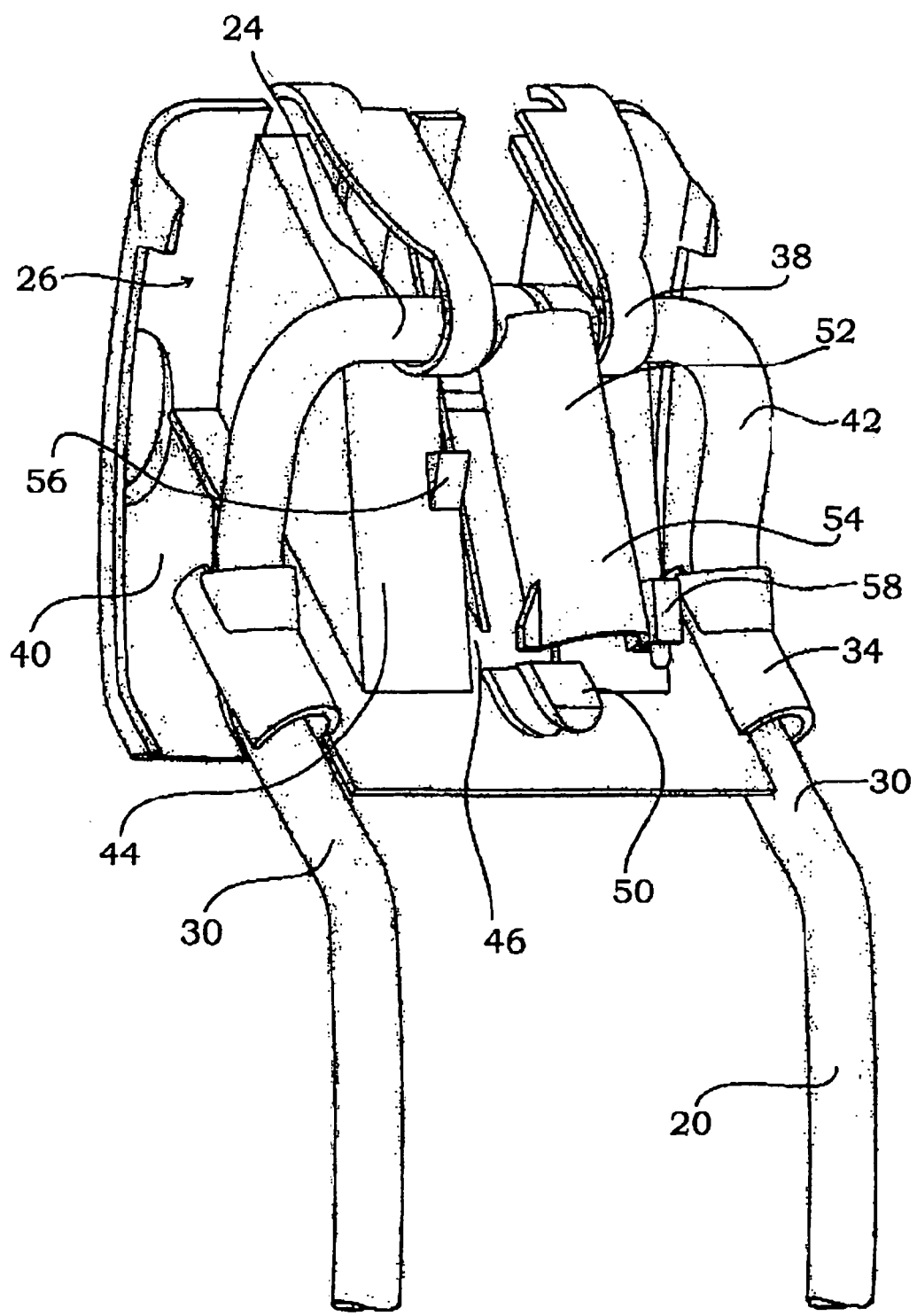
FIG. 4: is an illustration similar to FIG. 2 with the headrest now being in the accident position

The supporting member 26 has a plate 40 the back side of which fits on the bars 20 and on the transverse part 24 on the front side thereof in the normal utilization position. The supporting member 26 further has a housing 44 which, in the utilization position, is located between the bars 20 and underneath the transverse part 24. It rigidifies the supporting member and its upper edge, which is inclined at an oblique angle, forms part of the loops 38. On its back side, the housing 44 opens to a slot 46 in which there is disposed a spring 48 configured to be a tension spring. Said spring in turn is supported by an abutment 50 that is configured to be approximately hook-shaped and is located in the rearmost, deepest end region of the housing. On the other side, it is supported by the transverse part 24, in fact in the center of the transverse part. The spring has a relatively high tensile force of 200 N for example and a spring travel of 5 to 10 cm. It is designed to be capable of causing the supporting member 26 together with the padding 28 and the associated parts to move relatively quickly from the normal utilization position (FIGS. 1 and 2) to the accident position (FIGS. 3 and 4). In the accident position, the supporting member is not only located before the utilization position in the x direction, it is also displaced upward in the y direction. This is an advantage because, as a result thereof, on the one side, the supporting member 26 moves closer to the occupant's head in the x direction, thus providing better support and because, on the other side, in the event of a rear impact, the occupant will move slightly upward so that his head will move higher, this movement being compensated by the headrest as it rises so that on the whole the head is advantageously supported.

The spring 48 is blocked by a locking device 52. For this purpose, an approximately shell-shaped arm 54 is hinged to the transverse part 24 in proximity to the spring 48. In the normal utilization position it is supported at its lower end by about two approximately triangular brackets 56, thus preventing the supporting member 26 from moving upward. If the arm 54 is moved in the negative x direction by its lower end, meaning if it is pivoted, it is disengaged from the brackets 56 and the spring 48 is then enabled to pull the entire supporting member 26 upward into the position shown in FIG. 3.

A release device 58, which, in the concrete implementation, is configured to be a squib, is connected to the arm 54. Said squib is electrically ignitable. From FIG. 1 it can be seen that the release device 58 is connected to a crash sensor 62 through a connection 60 shown in a dashed line. Said crash sensor enables the device in the presence of decelerations as they are typical for a rear impact or a similar accident. Upon ignition of the squib 58 forming the release device 58, the arm 54 is disengaged and the spring 48 pulls the supporting member 26 in the position shown in FIG. 3. The movement of the supporting member 26 in the positive x direction and in the positive z direction is decelerated and stopped by the transverse part 24 abutting against the end of the loops 38 on the one side and by limit stops 61 that are provided above the guide regions 34 and come into contact with the upper end portion 42 of the bars 20 above the oblique portion 30 on the other side.

The supporting member 26 is mechanically held in the accident position not by the force of the spring 48 alone, but also by making the following two provisions: firstly, lugs 64 are formed in the rear part of the housing 48, said lugs being located in the region of the loops 38. As the supporting member 26 rises, the transverse part 24 rides along the slant upper edge of the housing 44, moves towards the rear end of the loops 38 and rides over the lugs 64. Secondly, as the headrest is moving to the accident position, the guide regions 34 ride at least partially beyond the upper bend and are located in the upper end portion 42. Said upper end portion is about the same length as the length of the oblique portion 30 but is oriented in the same direction as the non bent portion of the bars beneath the lower bend. Upon experiencing a crash load, the guide regions can be supported at their upper end portion 42. They will remain in their position and not be pushed into the oblique portion. As a result, the position of the supporting member 26 is mechanically stabilized both in its upper and in its lower portion and is thus capable of taking the impact of the head. A certain resilience and, as a result thereof, dissipation of the kinetic energy are achieved by deformations, with the spring 48 being compressed again. What matters is that the supporting member 26 is mechanically held and supported in its accident position in such a manner that it is capable of taking the acceleration forces (impact of a head) acting thereon.

Other means that can be quickly enabled can be utilized in lieu of the release device 58 discussed herein above. It is for example possible to hold the supporting member 26 by means of a wire that is configured to quickly melt if the current pulse is sufficiently high. The arm 54 may for example be elastically biased by an additional spring 48 in the swung-out position as shown in FIG. 3. Said additional spring 48 is blocked by the fusible wire. It is released upon destruction of the fusible wire. The process is the same as described herein above.

Finally, the release device 58 can also be enabled by an electromagnet. Said electromagnet can actuate a catch that retains the arm 54, which is biased by a separate spring (not shown), in the locked position. As soon as the electromagnetic device is responsive, the arm is disengaged and the above described process takes place.

The supporting member 26 may also be formed from several pieces. It may be made from another suited material such as aluminum for example. In the implementation described herein, the supporting member is configured so as to be threadable onto the lower free ends of the bars, which have not been illustrated herein. For this purpose it is provided with an opening 61 that extends in the x direction above a plate 40 and that can be opened far enough to allow a transverse part 24 to be passed therethrough. As a result, the transverse part is within the two loops 38. As illustrated in all of the Figures, this condition is maintained.

Figure 5:
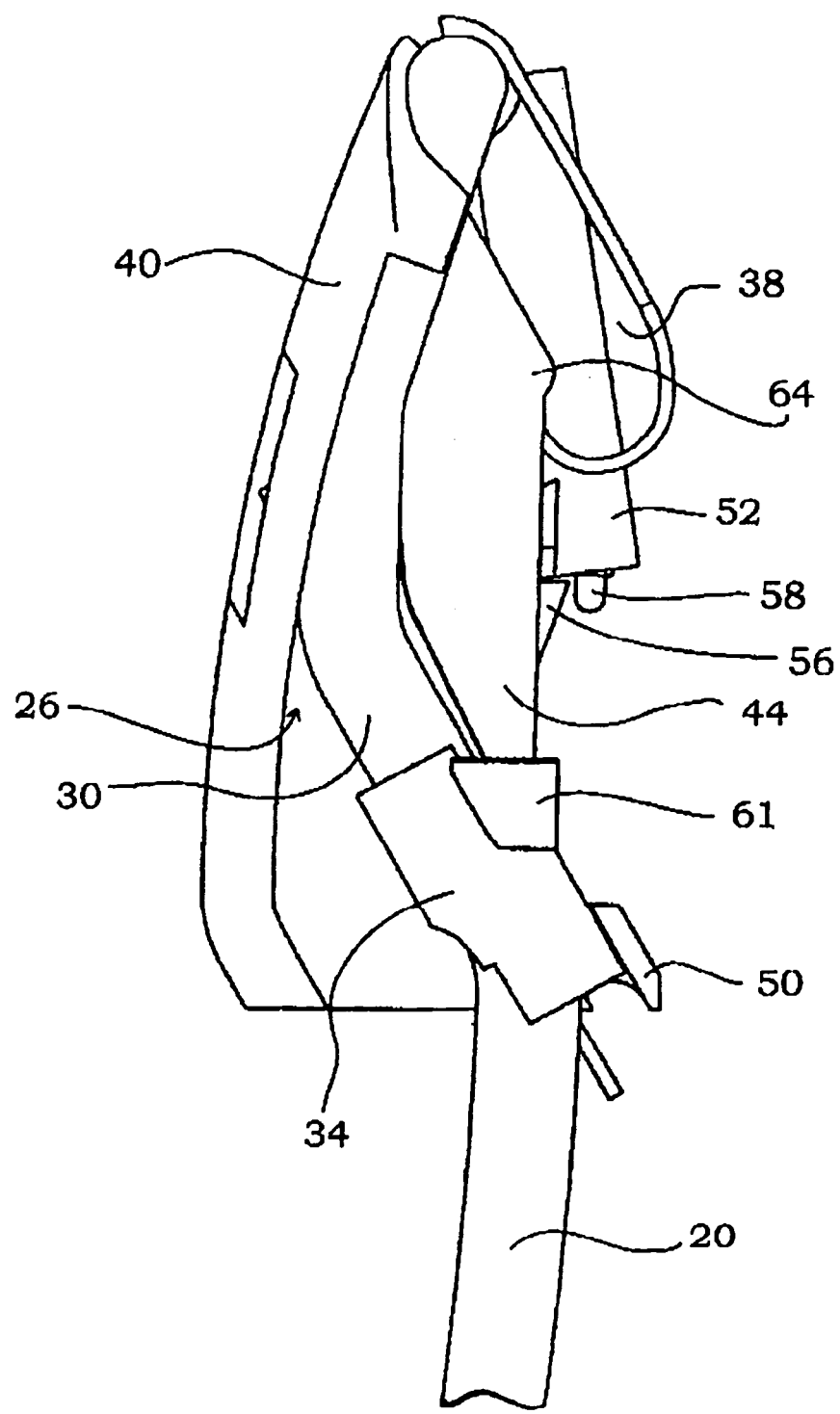
FIG. 5: is a side view similar to FIG. 1 of a second embodiment.

Whereas in the exemplary embodiment discussed herein above and illustrated in the FIGS. 1 through 4 the two oblique portions 30 of the bars 20 are built according to the same principle, this is not the case in the exemplary embodiment of FIG. 5. There, as viewed with respect to the vehicle's interior, the inner bar is inclined to the z axis at a smaller angle than the outer bar. As a result thereof, the supporting member 26 moves slantways towards a side air bag as it rises into the accident position. The occupant's head is prevented from slipping toward the center of the vehicle and is instead moved towards the side airbag where, now located between said side airbag and the somewhat inclined headrest, it is better held in place than it would be by a headrest that remains parallel to the y axis in the accident position as well.

What is claimed is:

1. A headrest of an automotive vehicle seat which headrest has at least one bar and one supporting member, the supporting member being normally in a utilization position and which headrest, when the automotive vehicle is involved in an accident, leaves the utilization position and adopts an accident position in which the supporting member is located, when viewed in the forward direction, in front of the position the supporting member has in the utilization position, whereby the automotive vehicle seat has a backrest, the backrest has an upper edge, the at least one bar comprises an oblique portion that is located above the upper edge of the backrest, said oblique portion has one component in the forward direction and one component in the vertical direction, the supporting member comprises a guide region that conforms to the oblique portion of the bar and that is movable relative to said oblique portion, an elastic means is provided, which is disposed between the at least one bar and the supporting member and biases the supporting member in the accident position and a releasable locking device is provided, which locking device being associated with the elastic means and normally blocks the elastic means, but releases the elastic means when the automotive vehicle is involved in an accident, in case of an accident the elastic means is allowed to cause the supporting member to move from the utilization position to the accident position.

2. The headrest according to claim 1, whereby the headrest comprises two bars and the two bars have one oblique portion each.

3. The headrest according to claim 2, whereby the two oblique portions of the bars are built according to the same principle.

4. The headrest according to claim 2, whereby the two oblique portions are different in configuration.

5. The headrest according to claim 1, whereby the supporting member has a holding system cooperating with the bar and/or a transverse part and keeping the supporting member in the accident position, once the accident position is reached.

6. The headrest according to claim 1, whereby the supporting member is made from one piece.

7. The headrest according to claim 1, whereby the angle of the oblique portion to the positive vertical axis ranges from 15 degree to 40 degree when viewed and measured in the direction toward the positive forward axis.

8. The headrest according to claim 1, whereby the supporting member comprises a plate and an opening extending above the plate in the forward direction and being openable to an extent allowing passage of a transverse part therethrough.

9. The headrest according to claim 1, whereby, when the supporting member is in the accident position, the at least one guide region of the supporting member is located at least in parts above the oblique portion, and the upper end portion is oriented differently from the oblique portion.

10. The headrest according to claim 1, whereby the supporting member comprises at least one lug and, when the supporting member is in the accident position, the transverse part is located behind said lug.

11. The headrest according to claim 4, whereby the automotive vehicle has a side airbag and, in the accident situation, the supporting member is inclined toward the side airbag.

12. The headrest according to claim 6, whereby the supporting member is made from plastic material.

13. The headrest according to claim 9, whereby the upper end portion is substantially parallel to a plate of the supporting member.

* * * * *